May 18, 1954     T. H. EYLES     2,678,584
CLIP-ON SUNGLASSES
Filed April 2, 1951

INVENTOR.
THOMAS H. EYLES
BY
ATTORNEY

Patented May 18, 1954

2,678,584

UNITED STATES PATENT OFFICE 2,678,584

CLIP-ON SUNGLASSES

Thomas H. Eyles, Leominster, Mass., assignor to Foster Grant Co., Inc., Leominster, Mass., a corporation of Massachusetts Application April 2, 1951, Serial No. 218,728

2 Claims. (Cl. 88—41)

This invention relates to improvements in a clip-on sunglass of the type adapted to be attached to the frame of a pair of spectacles or eyeglasses so as to cover the lenses and shield the eyes of the wearer from the glare of sun.

Clip-on glasses of this type have usually consisted of a pair of metal rims each containing a suitably colored lens, each rim having hooks for engagement with the spectacles or glasses to which they are to be applied, and the two rims being connected by a resilient metal bridge.

One object of my invention is to provide a sunglass of this type that dispenses with the metal frames and thereby reduces the cost of manufacture and expedites the production of the articles.

Another object is to provide novel means for anchoring the ends of the spring bridge-piece to the lenses or eye-shields.

A further object is to provide a construction in which each lens or eye-shield is made of a single piece of molded plastic material having the attaching hooks, and the bridge anchoring means, formed integral therewith.

The invention is illustrated in the accompanying drawings in which.

The lenses or eye-shields 10 are made of suitably colored molded plastic material, such as cellulose acetate or other plastic, and are preferably of convexo-concave shape. The lenses may be molded with rim portions 11 having a beading effect that simulates the appearance of the conventional frame of the ordinary type of clip-on glass, and attaching hooks 12 are formed integral with the rim portion of each lens at spaced points around its outer edge.

Figure 5:
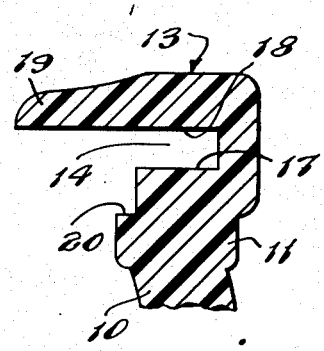
Figure 4:
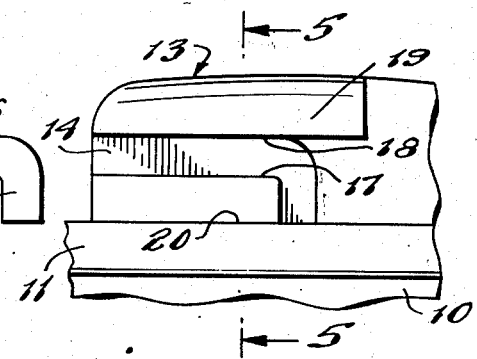
Fig. 4 is an exploded view showing an end of the bridge before insertion into the socket in which it is to be anchored; and, Fig. 5 is a view in cross-section taken on the line 5—5 of Fig. 4.

The anchoring means, which is also formed integral with and of the same plastic material as the lens, consists of a socket 13 having a cavity 14 for receiving an end 15 of the leaf spring metal bridge 16. The ends 15 are preferably downwardly bent as shown. The socket cavity 14 is formed to correspond to the shape, thickness, and width of the end 15 of the bridge to be received in the socket. It has two substantially parallel walls or surfaces 17 and 18 that are spaced apart the thickness of the bridge-end 15 and that extend lengthwise of the socket. The upper wall 18 is somewhat longer than, and has an inner edge portion 19 that projects beyond the inner edge of, the companion lower wall 17, as best seen in Fig. 5. As seen in Figs. 4 and 5 the cavities 14 are each open along one side.

Figure 1:
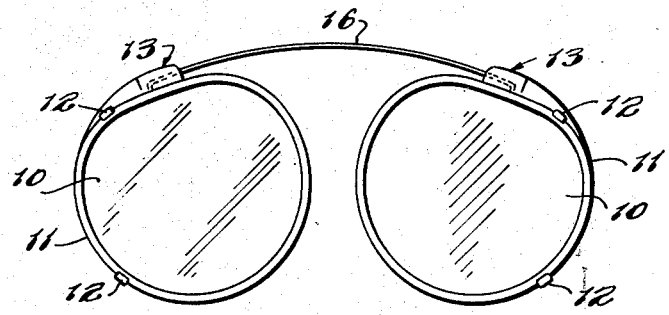
Fig. 1 is a front elevation of a clip-on sunglass embodying the invention.
Figure 3:
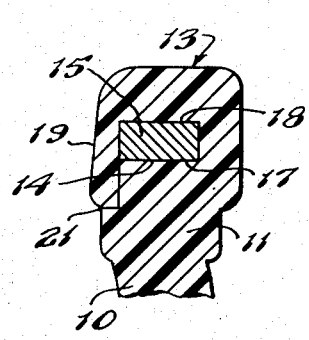
Fig. 3 is a view in cross-section taken on the line 3—3 of Fig. 2.
Figure 2:
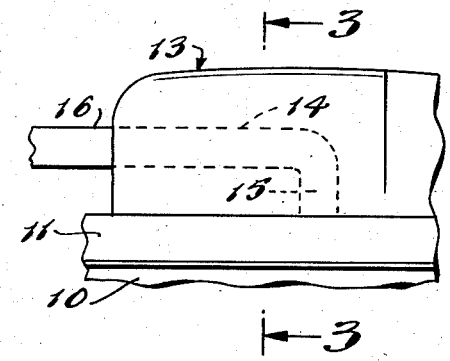
Fig. 2 is an enlarged fragmentary view showing an end of the bridge anchored to one of the lenses.

In anchoring the bridge 16 to the lenses, the ends of the bridge are inserted in the socket cavities and then the edges 19 of the upper walls 18 are rolled or turned down to close the open side of the cavities 14 so as to confine or anchor the bridge-ends firmly in the socket, as shown in Figs. 2 and 3. The lower wall may be formed with a shoulder 20 against which the wall-end 19 abuts when bent down in position to close the socket and anchor the bridge. The shoulder is preferably formed on the inner surface of the socket so that the joint 21 formed on bending down the wall-end 19 will not be seen when the clip-on glasses are viewed from the front.

Instead of bending the ends 15 of the bridge in hook-form they may be otherwise suitably shaped or formed, and the cavities 14 correspondingly shaped, to lock the ends of the bridge in the sockets. Other modifications in the construction herein described and illustrated may be made within the scope of the invention.

What I claim is:

1. A sunglass of the clip-on type comprising a pair of lenses of plastic material having integral hooks for attaching them to a frame to which they are to be applied, a spring bridge connecting the two lenses, said bridge having a downward substantially right angled bend at each end, a socket on the upper edge of and integral with each lens, said socket having a substantially right angled cavity normally open along one side to receive the end portions of the spring bridge, and having parallel upper and lower walls, the lower wall having a shoulder along the normally open side of the cavity, and the upper wall having an extended portion that projects beyond said shoulder and is of a length to be rolled down with its outer end seated on the shoulder to enclose the spring bridge ends firmly in place.

2. A sunglass of the clip-on type comprising a pair of lenses of plastic material having integral hooks for attaching them to a frame to which they are to be applied, a spring bridge connecting the two lenses, said bridge having a downward substantially right angled bend at each end, a socket on the upper edge of and integral with each lens, said socket having a substantially right angled cavity normally open along one side to receive the end portions of the spring bridge, and having parallel upper and lower walls, said upper wall having an extended portion that projects beyond said lower wall and is of a length to be rolled down with its outer end abutting the lower wall to enclose the spring bridge ends and anchor them firmly in place.

References Cited in the file of this patent

UNITED STATES PATENTS

| Number | Name | Date |
|---|---|---|
| 1,515,624 | Schumacher | Nov. 18, 1924 |
| 1,517,685 | Searles | Dec. 2, 1924 |
| 1,630,258 | Durgin | May 31, 1927 |
| 2,512,011 | Crane | June 20, 1950 |
| 2,584,000 | Ehlert et al. | Jan. 29, 1952 |

FOREIGN PATENTS

| Number | Country | Date |
|---|---|---|
| 416,303 | Great Britain | Sept. 13, 1934 |